United States Patent
Gretz (10) Patent No.: US 7,259,328 B1
(45) Date of Patent: Aug. 21, 2007

(54) ADJUSTABLE TWO-TIER COVER ASSEMBLY FOR AN ELECTRICAL BOX

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/602,026

(22) Filed: Nov. 20, 2006

(51) Int. Cl.
*H01H 9/02* (2006.01)

(52) U.S. Cl. .................. 174/57; 174/53; 174/559; 174/50; 220/3.2; 220/3.3

(58) Field of Classification Search ............ 174/480, 174/481, 50, 53, 57, 58, 66, 67, 559, 503; 220/3.2, 3.3, 3.4, 3.5, 3.6, 3.7, 3.8, 3.9, 4.02, 220/241, 242; 248/906; 439/535, 536
See application file for complete search history.

(56) References Cited

U.S. PATENT DOCUMENTS

| | | | | |
|---|---|---|---|---|
| 4,634,015 A | * | 1/1987 | Taylor | .................. 220/3.7 |
| 5,012,043 A | * | 4/1991 | Seymour | .................. 174/57 |
| 5,171,939 A | * | 12/1992 | Shotey | .................. 174/67 |
| 5,736,674 A | * | 4/1998 | Gretz | .................. 174/50 |
| 5,773,760 A | * | 6/1998 | Stark et al. | .................. 174/66 |
| 5,931,325 A | | 8/1999 | Filipov | |
| 5,967,354 A | | 10/1999 | Whitehead et al. | |
| 6,737,576 B1 | | 5/2004 | Dinh | |
| 6,953,894 B2 | | 10/2005 | Ungerman et al. | |
| 6,956,169 B1 | * | 10/2005 | Shotey et al. | .................. 174/58 |
| 7,038,131 B1 | | 5/2006 | Gretz | |
| 7,077,280 B1 | * | 7/2006 | Gretz | .................. 174/57 |
| 7,151,219 B1 | * | 12/2006 | Gretz | .................. 174/58 |

* cited by examiner

*Primary Examiner*—Angel R. Estrada (57) ABSTRACT

A two-tier cover assembly for a field service box. The two-tier cover assembly can be retrofitted to an existing field service electrical box to protect the electrical device that is housed therein. The cover assembly provides two configurations for protecting the electrical box, including an expanded and a collapsed configuration. In the expanded configuration, the cover assembly provides two cord openings that are accessible with the cover plate closed. In the collapsed configuration, the cord openings are completely closed to seal all openings and thereby protect the electrical device from rain, dirt, insects and other hazards.

15 Claims, 11 Drawing Sheets

ADJUSTABLE TWO-TIER COVER ASSEMBLY FOR AN ELECTRICAL BOX

FIELD OF THE INVENTION

This invention relates to covers for electrical boxes, and specifically to an adjustable two-tier cover assembly for attachment to an electrical box.

BACKGROUND OF THE INVENTION

Electrical boxes for outdoor use, commonly termed "FS" or field service boxes, are typically mounted on the exterior of buildings for providing convenient access to electrical outlets and other electrical devices such as switches and timers. To keep dirt, insects, and other debris out of the FS box, a simple hinged cover plate is typically provided for closing the front opening of the box. As a result of being mounted outdoors, FS boxes are exposed to the elements, including heat, cold, rain, insect infiltration, and similar hazards, which eventually may negatively affect the appearance and functioning of the box. Field service boxes constructed of metal for example, typically include hinged covers that become rusted and cease to function after repeated years of exposure to the elements. Additionally, conventional hinged covers are large, extending a substantial distance from the exterior wall and therefore unsightly and unattractive to the homeowner. Conventional hinged electrical box covers typically include cord openings that are open to the elements regardless of whether an electrical cord is plugged into the electrical box or not. Therefore, the interior of the conventional cover is always exposed to the elements, regardless of whether or not an electrical cord is plugged into the electrical device within the cover.

What is needed therefore is a cover assembly that can be installed over an existing or a new FS box to provide better protection to an electrical receptacle installed therein and which also provides an overall lower profile when the receptacle is not in use. What is needed is an electrical cover assembly that is adjustable to provide a first level of protection when electrical cords are connected to the installed electrical device and a second, more secure level of protection when the electrical device is not in use.

SUMMARY OF THE INVENTION

The invention is a two-tier cover assembly for a field service box. The two-tier cover assembly can be retrofitted to an existing field service electrical box to protect the electrical device that is housed therein. The cover assembly provides two configurations for protecting the electrical box, including an expanded and a collapsed configuration. In the expanded configuration, the cover assembly provides two cord openings that are accessible with the cover plate closed. In the collapsed configuration, the cord openings are completely closed to seal all openings and thereby protect the electrical device from rain, dirt, insects and other hazards.

OBJECTS AND ADVANTAGES

Several advantages are achieved with the cover assembly of the present invention, including:
(1) The cover assembly can be retrofitted to an existing field service electrical box to upgrade its operation or appearance.
(2) The cover assembly provides additional functionality over existing field service boxes including a compressed configuration and an expanded configuration.
(3) The cover assembly provides a compressed configuration for completely sealing the interior of the field service box and its contents from rain, dirt, insects, and other hazards.
(4) The cover assembly provides an expanded configuration for protecting the interior of the field service box while also providing dual cord openings for accessing an installed electrical receptacle.
(5) The cover assembly can be easily converted from an expanded to a compressed configuration as desired by the homeowner.

These and other objects and advantages of the present invention will be better understood by reading the following description along with reference to the drawings.

INDEX TO REFERENCE NUMERALS IN DRAWINGS

| | |
|---|---|
| 20 | adjustable cover assembly |
| 22 | inner frame member |
| 24 | outer frame member |
| 26 | peripheral wall of inner frame member |
| 28 | inner surface of peripheral wall of inner frame member |
| 30 | outer surface of peripheral wall of inner frame member |
| 32 | front edge of inner frame member |
| 34 | rear edge of inner frame member |
| 36 | outward extending lip |
| 38 | rear panel of inner frame member |
| 40 | opening in rear panel |
| 42 | electrical device mounting aperture |
| 44 | slot in rear panel |
| 46 | outward-extending ramp |
| 48 | outward extending ledge |
| 50 | outer edge of outward-extending ramp |
| 51 | inner edge of outward-extending ramp |
| 52 | side ramp |
| 53 | outward extending projections |
| 54 | peripheral wall of outer frame member |
| 56 | inner surface of peripheral wall of outer frame member |
| 58 | outer surface of peripheral wall of outer frame member |
| 60 | front edge of outer frame member |
| 62 | rear edge of outer frame member |
| 64 | inward extending lip of outer frame member |
| 66 | inward-extending ramp of outer frame member |
| 68 | post |
| 70 | outer edge of inward-extending ramp |
| 72 | inner edge of inward-extending ramp |
| 74 | tab on outer frame member |
| 76 | U-shaped slot in outer frame member |
| 78 | adapter plate |
| 80 | front surface of adapter plate |
| 82 | rear surface of adapter plate |
| 84 | tab |
| 86 | hook |
| 88 | top of hook |
| 90 | sloping front surface |
| 92 | central opening in adapter plate |
| 94 | aperture in adapter plate |
| 96 | cover member |
| 98 | peripheral wall of cover member |
| 100 | ear |
| 102 | aperture |
| 104 | U-shaped slot in cover member |
| 106 | latch member |
| 108 | opening in latch member |
| 113 | locking arrangement |
| 115 | minor ramp |
| 116 | directional arrow |
| 118 | limiting arrangement |
| 119 | attachment arrangement for securing adapter plate |
| 120 | gasket |
| 122 | electrical box |
| 124 | circular cord opening |
| 126 | electrical cord |
| 128 | duplex receptacle |
| 130 | fastener |

DETAILED DESCRIPTION OF THE INVENTION

Figure 1:
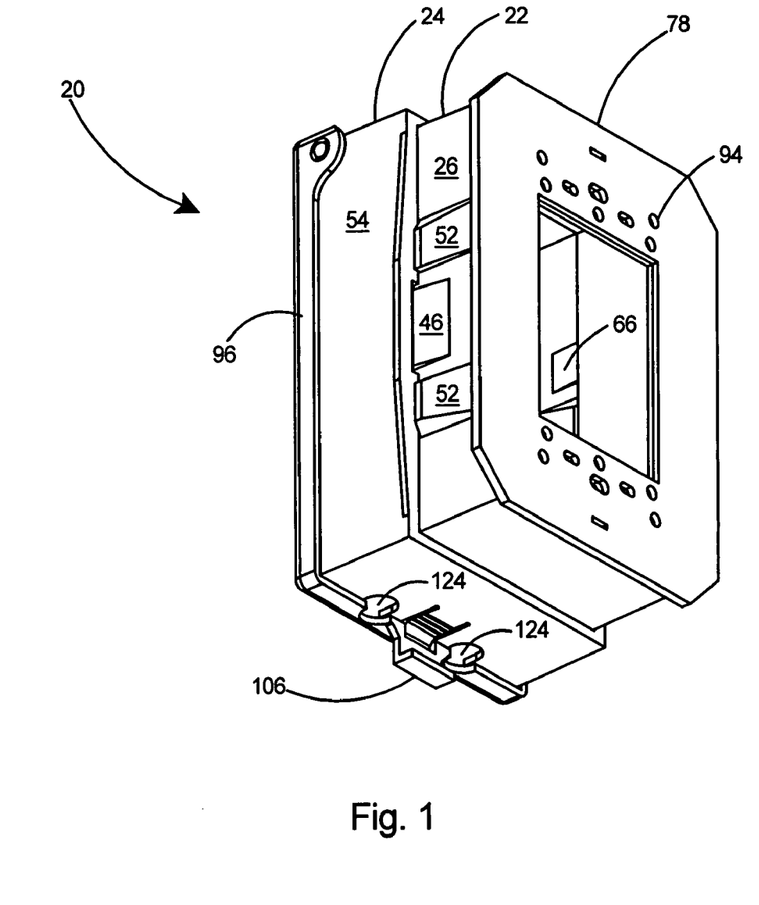
FIG. 1 is a rear perspective view of a cover assembly for an electrical box according to the present invention.

With reference to FIG. 1 there is shown a preferred embodiment of the present invention, an adjustable cover assembly 20 for use in covering an existing electrical box (not shown). The adjustable cover assembly 20 includes an inner frame member 22 that nests within and is slideable with respect to an outer frame member 24.

Figures 2, 3, 4:
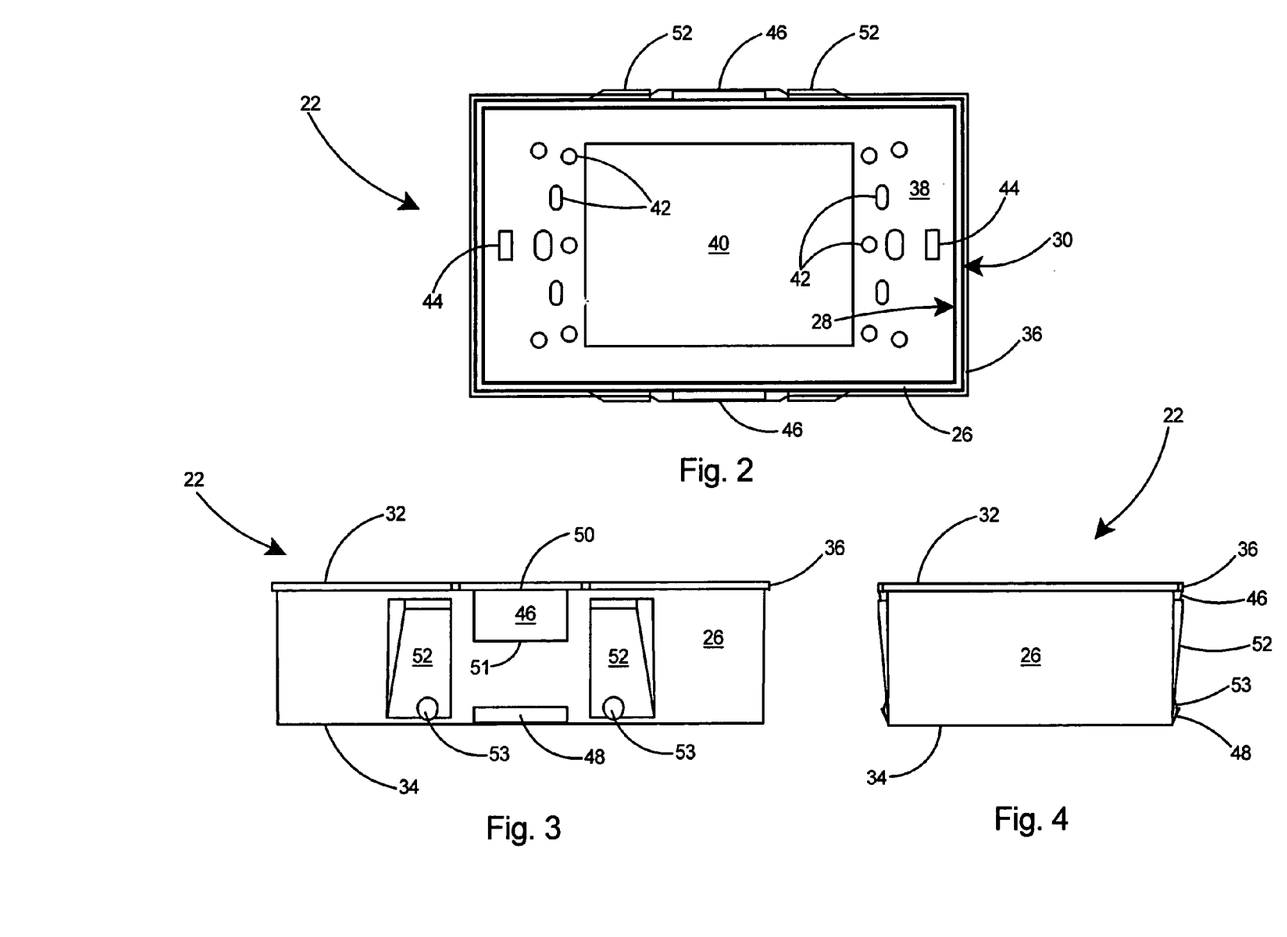
FIG. 2 is a front view of a inner frame member that forms a portion of the cover assembly of FIG. 1.
FIG. 3 is a side view of the inner frame member of FIG. 2.
FIG. 4 is an end view of the inner frame member of FIG. 2.

Referring to FIGS. 2-4, the inner frame member 22 includes a peripheral wall 26 having an inner surface 28, an outer surface 30, a front edge 32 and a rear edge 34. An outward extending lip 36 extends from the outer surface 30 of the peripheral wall 26 at the front edge 32 of the inner frame member 22. The inner frame member 22 further includes a rear panel 38 having an opening 40 centered therein, electrical device mounting apertures 42 surrounding the opening 40, and slots 44 between the mounting apertures 42 and the peripheral wall 26. An outward-extending ramp 46 extends from the outer surface 30 of the peripheral wall 26 of the inner frame member 22. The inner frame member 22 also includes an outward extending ledge 48 near the rear edge 34. The outward-extending ramp 46 on the inner frame member 22 includes an outer edge 50 and an inner edge 51 and the outward-extending ramp 46 slopes outward from the inner edge 51 to the outer edge 50. Side ramps 52 and outward extending projections 53 are further provided on the outer surface 30 of the peripheral wall 26 of the inner frame member 22.

Figures 5, 6, 7:
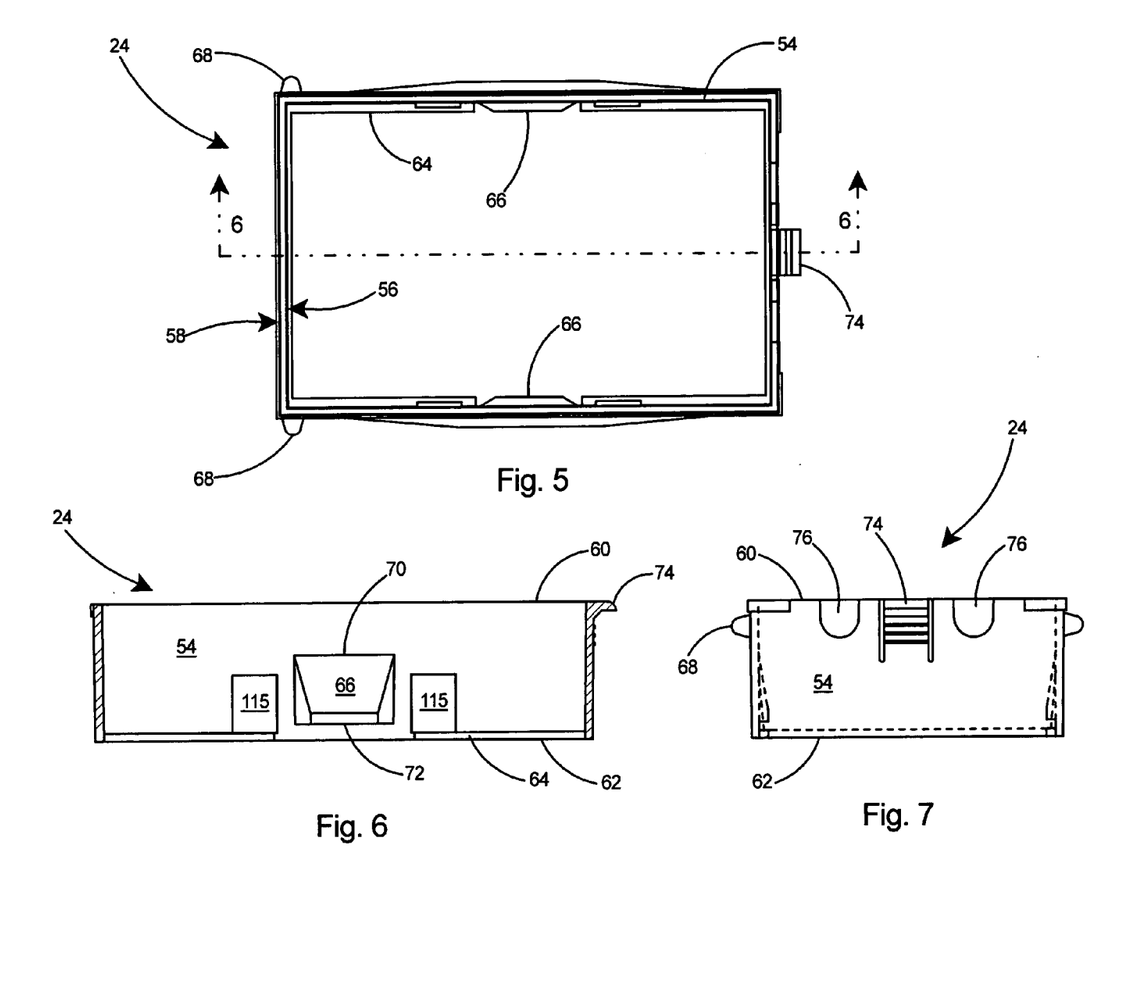
FIG. 5 is a front view of a outer frame member that forms a portion of the cover assembly of FIG. 1.
FIG. 6 is a sectional view of the outer frame member taken along line 6-6 of FIG. 5.
FIG. 7 is an end view of the outer frame member of FIG. 5.
Figure 8:
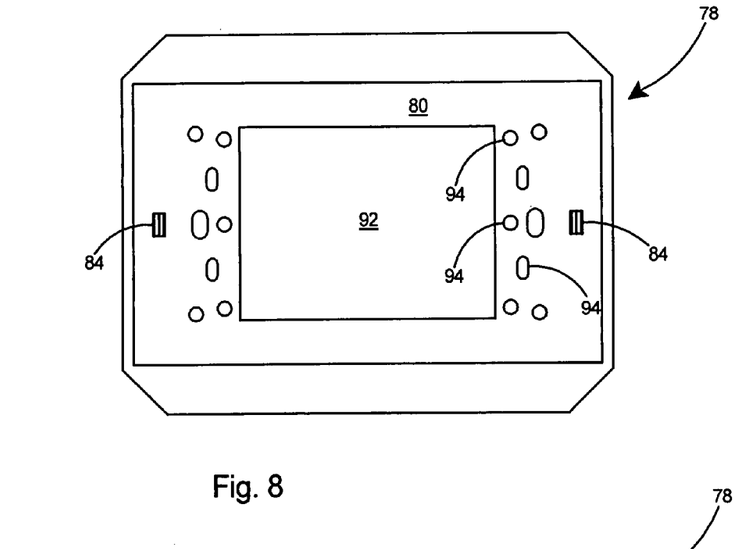
FIG. 8 is a plan view of an adapter plate that forms a portion of the cover assembly of FIG. 1.
Figure 9:
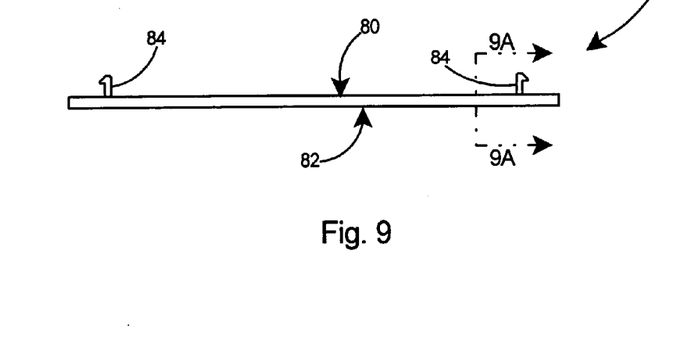
FIG. 9 is a side view of the adapter plate of FIG. 8.
Figures 9A, 10A:
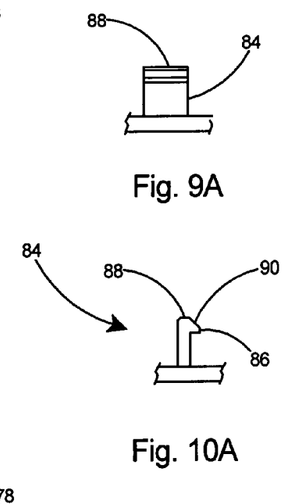
FIG. 9A is a sectional view of the adapter plate taken along line 9A-9A of FIG. 9.
FIG. 10A is a sectional view of the adapter plate taken along line 10A-10A of FIG. 10.
Figure 10:
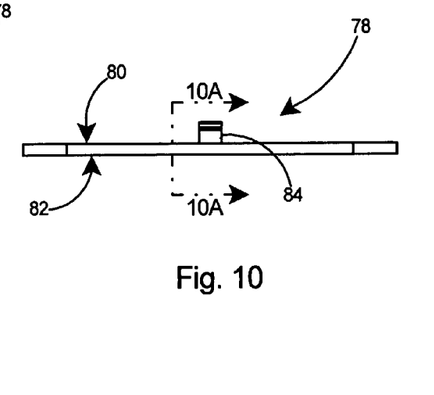
FIG. 10 is an end view of the adapter plate of FIG. 8.

With reference to FIGS. 5-7, the outer frame member 24 includes a peripheral wall 54 having an inner surface 56, an outer surface 58, a front edge 60, and a rear edge 62. The rear edge 62 of the outer frame member 24 is provided with an inward extending lip 64 and an inward-extending ramp 66 extends from the inner surface 56 of the peripheral wall 54. Posts 68 extend from the outer surface 58 of the outer frame member 24. The inward-extending ramp 66 on the outer frame member 24 includes an outer edge 70 and an inner edge 72 with the inward-extending ramp 66 sloping inward from the outer edge 72 to the inner edge 70. The outer frame member 24 further includes a tab 74 extending from the front edge 60 and U-shaped slots 76 in the peripheral wall 54 extending inwards from the front edge 60.

Referring to FIGS. 8-10A there is shown an adapter plate 78 that may form a portion of the adjustable cover assembly of the present invention. The adapter plate 78 includes a front surface 80, a rear surface 82, and tabs 84 extending from the front surface 80. The tabs 84 include one or more hooks 86 extending substantially laterally therefrom (see FIG. 10A). The hooks 86 include a top 88 and a sloping front surface 90 that slopes downward from the top 88 of the hook. A central opening 92 and apertures 94 are provided in the adapter plate 78.

Figure 11:
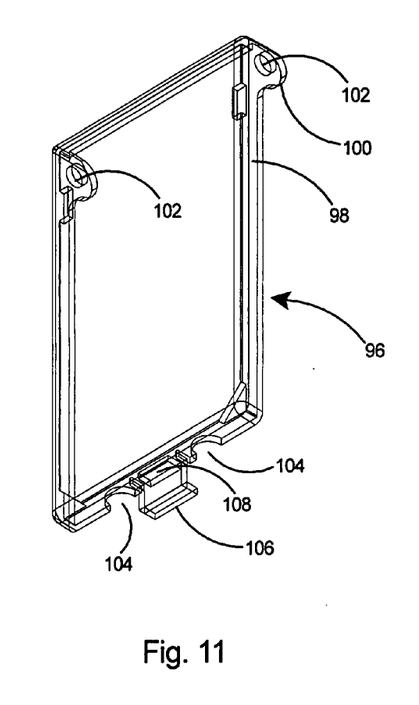
FIG. 11 is a perspective view of a cover member that forms a portion of the cover assembly of the present invention.
Figure 11A:
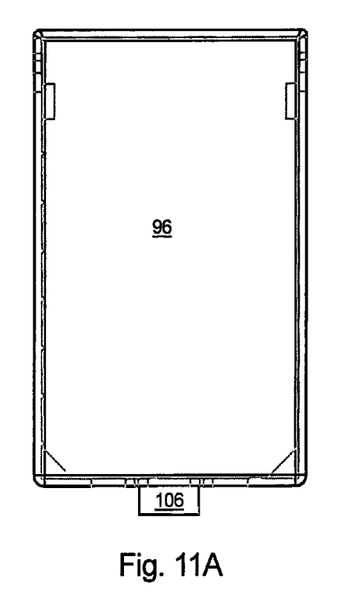
FIG. 11A is a front view of the cover member of FIG. 11.
Figure 11B:
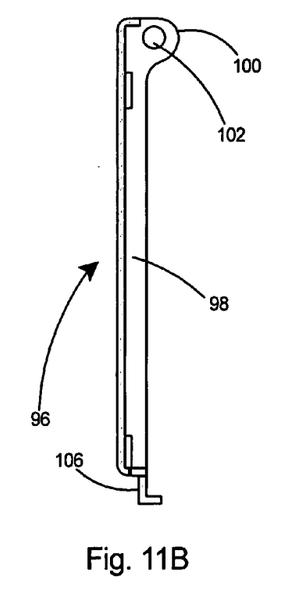
FIG. 11B is a side view of the cover member of FIG. 11.
Figure 11C:
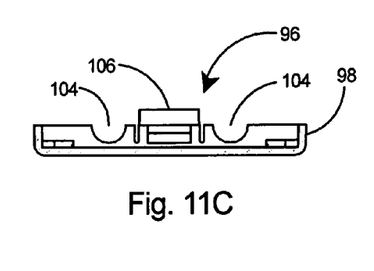
FIG. 11C is a bottom view of the cover member taken from line 11C-11C of FIG. 11A.

With reference to FIGS. 11-11C, there is shown a cover member 96 that forms a portion of the adjustable cover assembly of the present invention. The cover member 96 includes a peripheral wall 98, ears 100 extending from the peripheral wall 98, apertures 102 in the ears 100, and U-shaped slots 104 in the peripheral wall 98. The cover member 96 further includes a latch member 106 and an opening 108 in the latch member 106.

Figure 12:
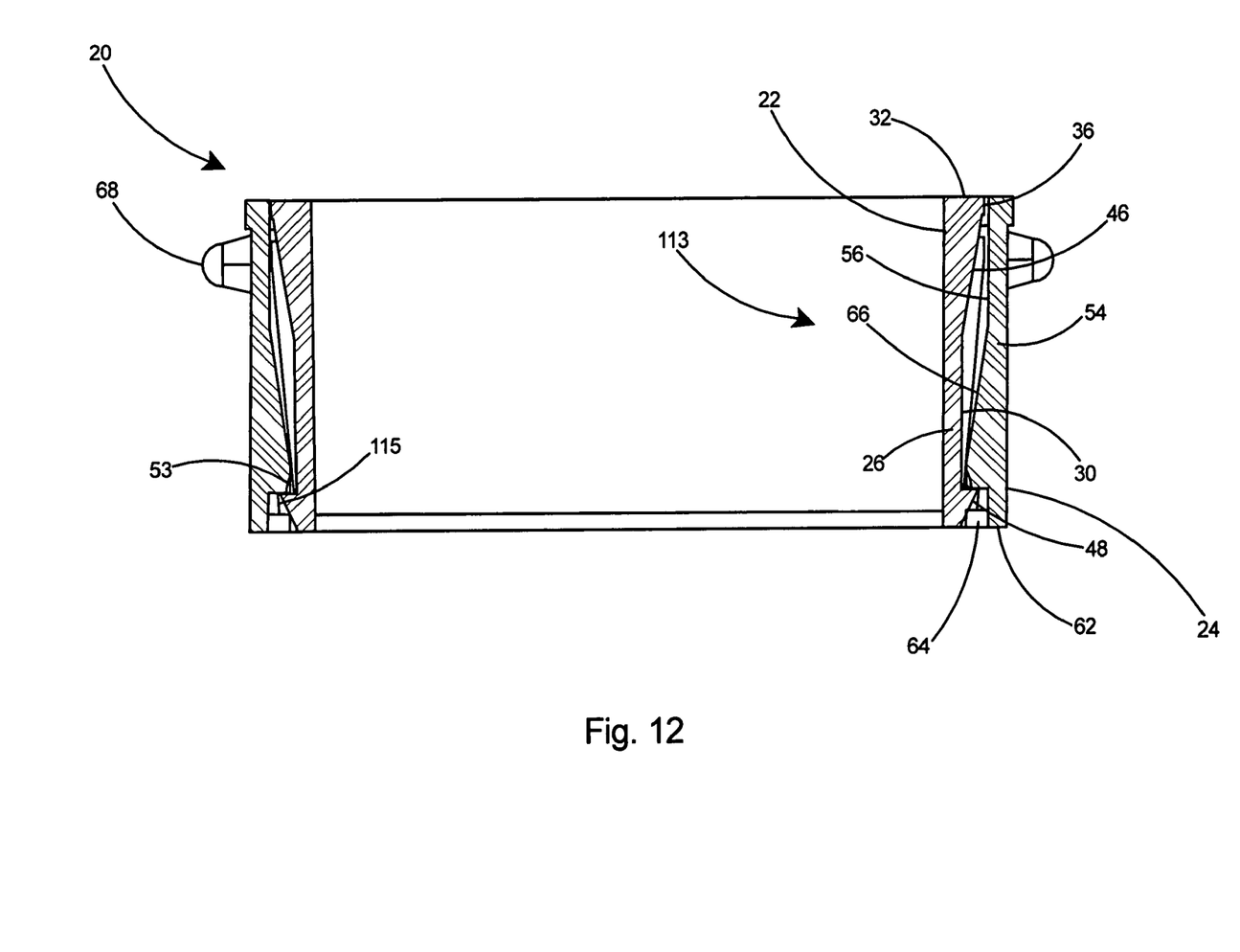
FIG. 12 is a sectional view of the top and inner frame members of the cover assembly of the present invention in a compressed configuration to form a one-tier cover for an electrical box.
Figure 13:
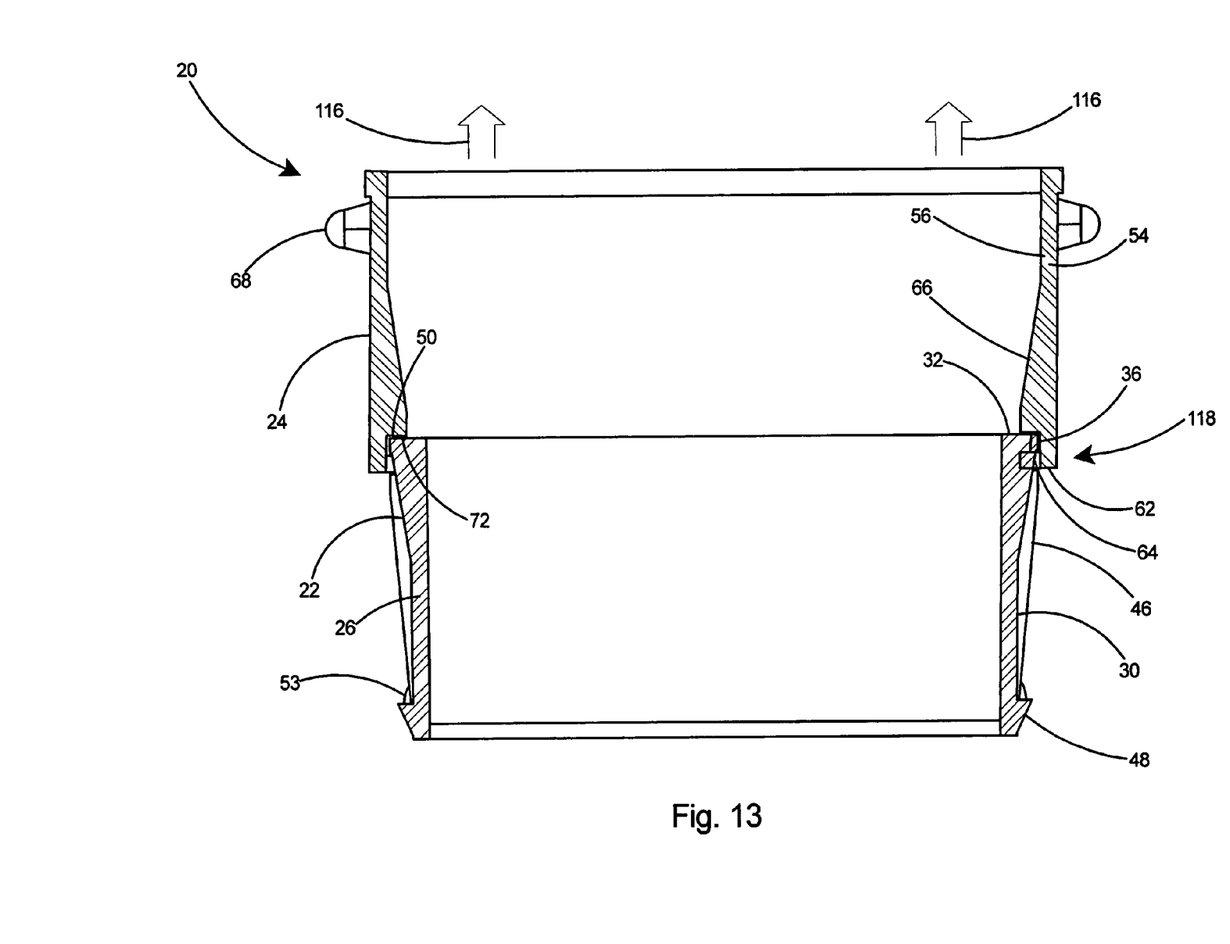
FIG. 13 is a sectional view of the top and inner frame members of the cover assembly of the present invention in an expanded configuration to form a two-tier cover for an electrical box.

With reference to FIGS. 12-13, by sliding the inner frame member 22 with respect to the outer frame member 24, the adjustable cover assembly of the present invention can be placed in either of two configurations, including a compressed configuration as shown in FIG. 12 and an expanded configuration as shown in FIG. 13. As shown in FIG. 12, the outward extending lip 36 on the front edge 32 of the inner frame member 22, the outward-extending ramp 46 extending from the outer surface 30 of the peripheral wall 26 of the inner frame member 22, the inward extending lip 64 on the rear edge 62 of the outer frame member 24, the inward-extending ramp 66 extending from the inner surface 56 of the peripheral wall 54 of the outer frame member 24, and the outward extending ledge 48 of the inner frame member 22 form a locking arrangement 113 for locking the adjustable cover assembly 20 in either the compressed configuration (see FIG. 12) or expanded configuration (see FIG. 13) as desired by the user.

In the compressed configuration, as shown in FIG. 12, the outer frame member 24 is slid over the inner frame member 22 until the inward-extending ramp 66 of the outer frame member 24 engages the outward extending ledge 48 of the inner frame member 22. Outward extending projections 53 on the inner frame member 22 engage the minor ramps 115 of the outer frame member 24 causing a frictional fit between the inner 22 and outer 24 frame members in the compressed configuration and thereby eliminating any rattling or vibration, caused by wind or other environmental factors, of the inner frame member 22 within the outer frame member 24.

In the expanded configuration, as shown in FIG. 13, the outer frame member 24 is slid outward, in the direction of the arrows 116, with respect to the inner frame member 22 until the outer edge 50 of the outward-extending ramp 46 of the inner frame member 22 engages the inner edge 72 of the inward-extending ramp 66 of the outer frame member 24. In the expanded configuration, the outward-extending ramps 46 of the inner frame member 22 also engage the rear edge 62 of the outer frame member 24. In the expanded configuration, the inner frame member 22 is therefore locked with respect to the outer frame member 24.

As shown in FIG. 13, the adjustable cover assembly of the present invention furthermore includes a limiting arrangement 118 for limiting the forward travel of the outer frame member 24 with respect to the inner frame member 22. The limiting arrangement 118 for limiting the forward travel of the outer frame member 24 with respect to the inner frame member 22 includes the outward extending lip 36 on the front edge 32 of the inner frame member 22 and the inward extending lip 64 on the rear edge 62 of the outer frame member 24. As both the inward extending lip 64 and outward extending lip 36 extend around a considerable portion of the inner periphery of the outer frame member 24 and the outer periphery of the inner frame member 22 respectively, further movement of the outer frame member 24 in the direction of arrows 116 is limited by lip 36 engaging lip 64.

Figure 14:
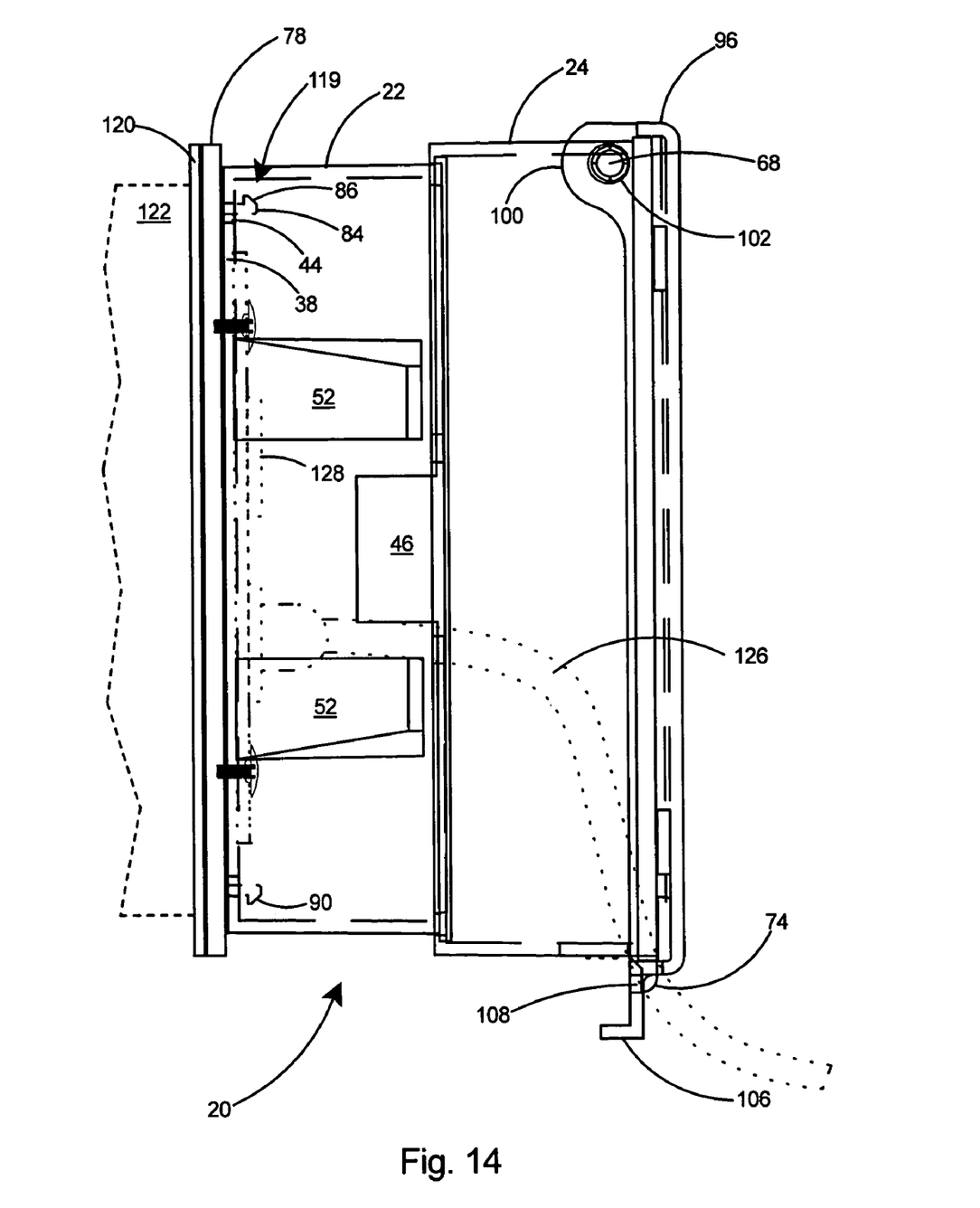
FIG. 14 is a side view of the cover assembly of the present invention in an expanded configuration thereby forming a two-tier cover for an electrical box.

With reference to FIG. 14, the adjustable cover assembly 20 is depicted in the expanded configuration including the cover member 96 and the adapter plate 78. The adapter plate 78 can be snapped onto the rear panel 38 of the inner frame member 22 by aligning the tabs 84 with the slots 44 in the rear panel 38 and pressing the tabs 84 and hooks 86 through the slots 44 in the rear panel 38. The tabs 84 and hooks 86 of the adapter plate 78 and the slots 44 within the rear panel 38 comprise an attachment arrangement 119 for securing the adapter plate 78 to the inner frame member 22. The sloping front surface 90 biasing the tabs 84 inwards when the adapter plate 78 is aligned with the slots 44 in the rear panel 38 of the inner frame member 22 and pushed thereon. An optional gasket 120 can be inserted between the adapter plate 78 and an existing electrical box 122 (dashed lines) and also, if desired, a gasket (not shown) can be inserted between the inner frame member 22 and the adapter plate 78. The cover member 96 is rotatably attached or hinged to the outer frame member 24, with the posts 68 of the outer frame member 24 extending through the apertures 102 in the ears 100 of the cover member 96. The cover member 96 is shown closed upon the outer frame member 24 with the tab 74 of the outer frame member 24 engaging the latch member 106 of the cover 96. The tab 74 of the outer frame member 24 is received in the opening 108 of the latch member 106 when the cover member 96 is closed upon the outer frame member 24.

Figure 17:
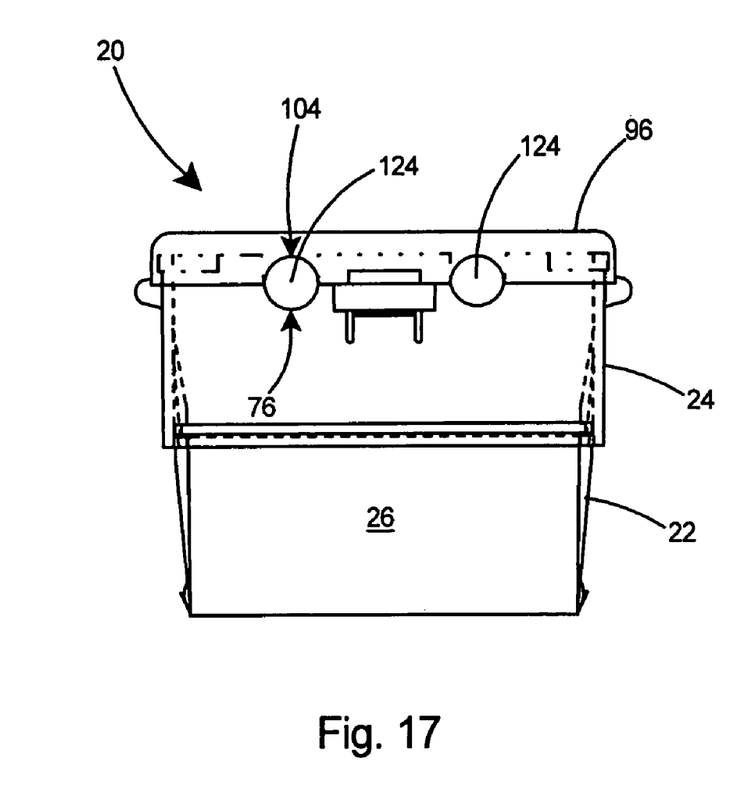
FIG. 17 is a bottom view of the cover assembly of the present invention in an expanded configuration.

When the adjustable cover assembly is in the expanded configuration, as shown in FIG. 17, and cover member 96 is closed upon the outer frame member 24, circular cord openings 124 are formed by the joining of the U-shaped slots 104 in the cover member 96 and the U-shaped slots 76 in the outer frame member 24. With the adjustable cover assembly 20 in the expanded configuration, the circular cord openings 124 are open as the outer frame member 24 is expanded outwards and the cord openings 124 are open and not obscured by the peripheral wall 26 of the inner frame member 22. Thus, the adjustable cover assembly 20 of the present invention can be placed in the expanded configuration at those times when an electrical cord 126 (see FIG. 14) is plugged into a receptacle 128 within the cover assembly 20. The cord openings 124 will be open when the adjustable cover assembly 20 is in the expanded configuration.

Figure 15:
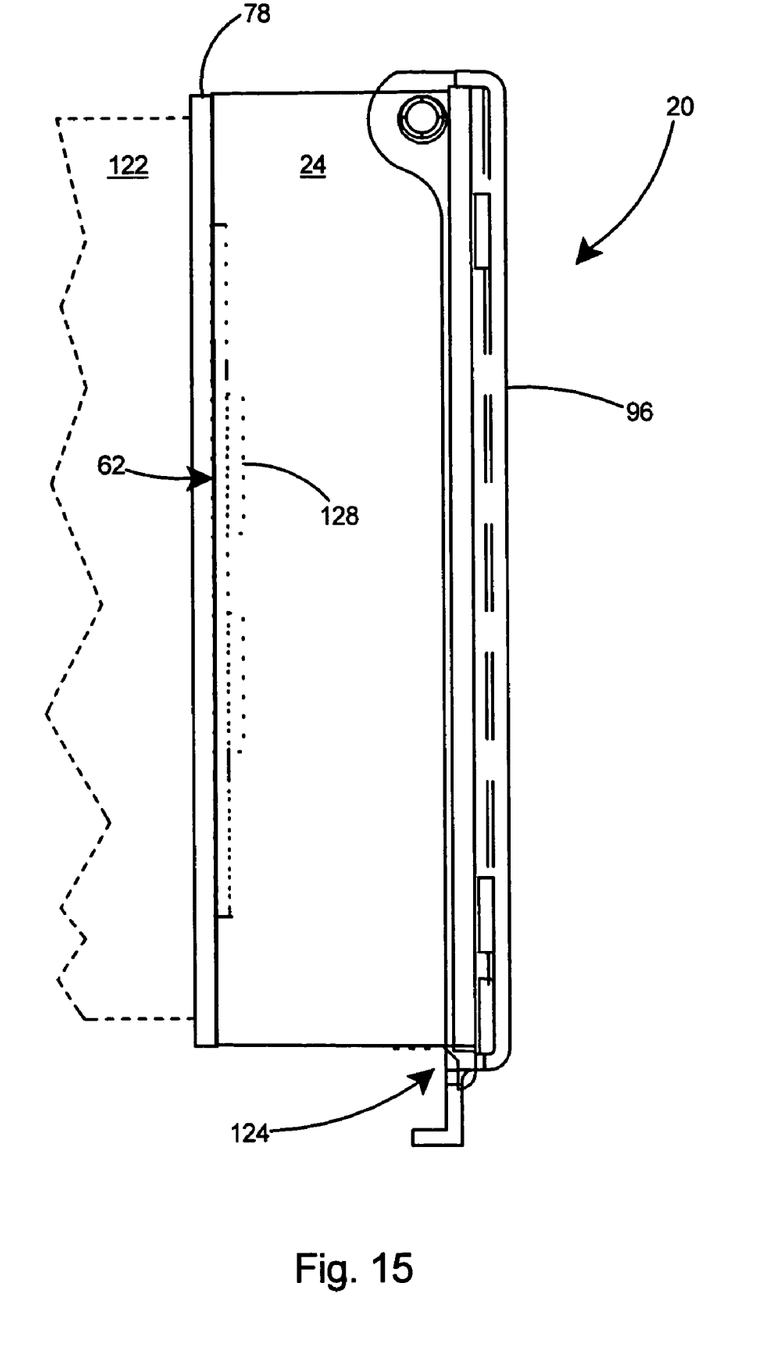
FIG. 15 is a side view of the cover assembly of the present invention in a compressed configuration thereby forming a two-tier cover for an electrical box.
Figure 18:
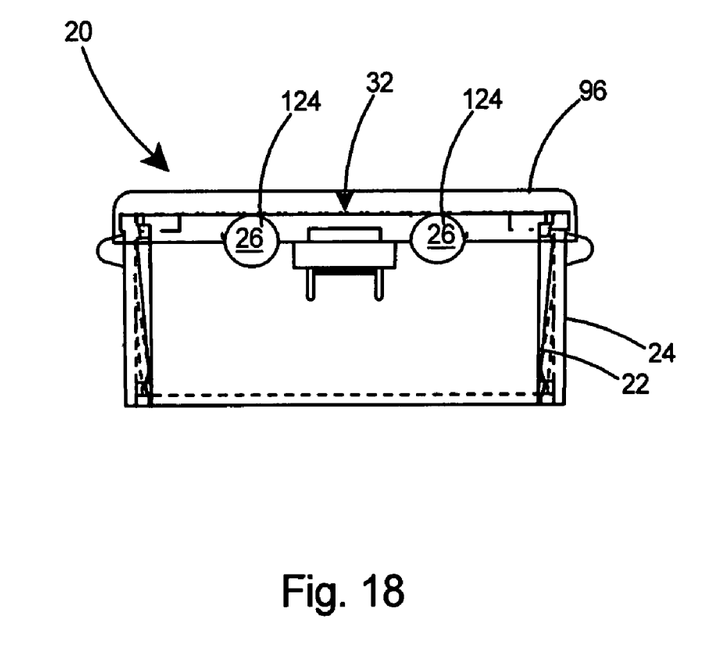
FIG. 18 is a bottom view of the cover assembly of the present invention in a compressed configuration.

FIG. 18 depicts a bottom view of the adjustable cover assembly 20 in the compressed configuration. With the adjustable cover assembly 20 in the compressed configuration, the circular cord openings 124 are closed as the outer frame member 24 is compressed inwards and the cord openings 124 are closed or obscured by the peripheral wall 26 of the inner frame member 22. Thus, in those times when the electrical receptacle 128 is not in use (see FIG. 15), the adjustable cover assembly 20 can be placed in the compressed configuration to close the cord openings and therefore seal all the openings on the cover assembly and thereby protect the interior of the cover assembly from dust, rain, infiltration by insects, etc. A side view of the adjustable cover assembly in a compressed configuration, shown in FIG. 15, depicts the cover member 26 closed on the outer frame member 24.

Figure 16:
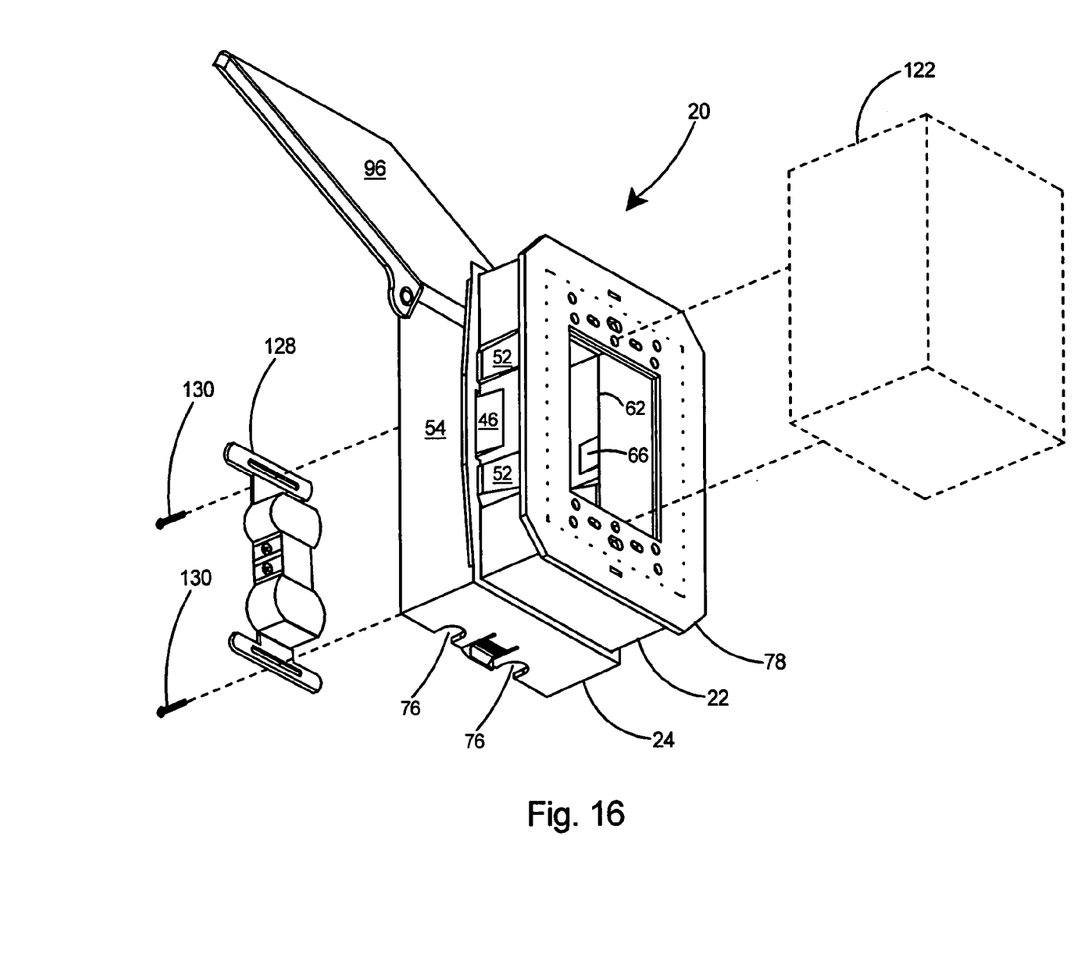
FIG. 16 is an exploded perspective view of the cover assembly of the present invention and a duplex receptacle in position to be retrofitted to a field service electrical box.

With reference to FIG. 16, there is shown an exploded perspective view of the adjustable cover assembly 20 of the present invention and a duplex receptacle 128 in position to be retrofitted to a field service electrical box 122 or FS box. The adapter plate 78 is optional. Two fasteners 130 are used to secure the adjustable cover assembly 20 to the FS box 122. Optional gaskets (not shown) can be inserted on each side of the adapter plate 78, if desired, to provide an air tight seal between the adapter plate 78 and FS box 122 and between the adapter plate 78 and inner frame member 22.

For an understanding of the operation of the adjustable cover assembly 20 of the present invention, the reader is referred to FIG. 16. The adjustable cover assembly 20 is typically used to cover an existing electrical box 122. The adjustable cover assembly 20 is provided assembled as a unit, with the inner 22 and outer 24 frame members secured together and the cover member 96 hinged to the outer frame member 24. The cover assembly 20 can also include the optional adapter plate 78 secured to the inner frame member 22. The adapter plate 78 is useful in those instances in which the inner frame member 22 is smaller than the electrical box 122. The adapter plate 78 is typically provided as a portion of the adjustable cover assembly 20, with the adapter plate 78 snapped onto the inner frame member 22. The adapter plate 78 can be easily removed if not required for a particular installation.

For a typical installation on an existing FS box 122, the existing conventional cover plate (not shown) and the electrical device, such as duplex receptacle 128 shown in FIG. 16, are removed from the existing FS box 122. The adjustable cover assembly 20 is then aligned with the existing FS box 122. Fasteners 130 are then secured through the electrical device mounting apertures 42 and into the device mounting apertures (not shown) within the FS box 122. Tightening the fasteners 130 secures the adjustable cover assembly 20 to the existing FS box 122. With gaskets (not shown) on each side of the adapter plate 78, an air tight fit is obtained between the adjustable cover assembly 20 and the existing FS box 122. In the expanded configuration the circular cord openings 124 will be open and electrical cords 126 (see FIG. 14) can be connected to the receptacle 128 within the adjustable cover assembly 20.

After being installed to the FS box 122, the adjustable cover assembly 20 is easily converted from the expanded configuration, shown in FIG. 16, to the compressed configuration, shown in FIG. 15, by grasping both sides of the peripheral wall 54 of the outer frame member 24, pulling the walls 54 on each side out slightly until the peripheral wall 54 clears the outward-extending ramp 46 of the inner frame member 22, and then applying slight pressure on the outer frame member 24 to push it over the inner frame member 22. The adjustable cover assembly 20 is in the fully compressed configuration (see FIG. 15) when the rear edge 62 of the outer frame member 24 is in contact with the adapter plate 78 or the wall surrounding the FS box 122. In the compressed configuration the circular cord openings will be closed and the adjustable cover assembly 20 sealed against the external environment.

The adjustable cover assembly 20 of the present invention therefore provides an attractive electrical box cover that can be adjusted to an expanded configuration for those times when electrical cords are in use or, alternatively, adjusted to a compressed configuration for those times when the plugs within the cover assembly are not in use and the user desires to minimize the profile of the cover assembly and also seal the interior of the cover assembly against the outside environment.

The inner frame member 22, outer frame member 24, adapter plate 78, and cover member 96 of the adjustable cover assembly 20 of the present invention may be constructed of metal or plastic but is most preferably each of these portions of the cover assembly are molded in one piece of plastic. The inner frame member 22, outer frame member 24, adapter plate 78, and cover member 96 can be molded of any suitable plastic including polycarbonate, polyvinylchloride, acrylonitrilebutadienestyrene, or a polyolefin.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An adjustable cover assembly for covering an electrical box comprising:
   an inner frame member including a peripheral wall having an inner surface and a front edge;
   an outer frame member including a peripheral wall having an outer surface and a rear edge;
   said inner frame member nesting within and slideable with respect to said outer frame member;
   said adjustable cover assembly including a compressed configuration and an expanded configuration;
   a locking arrangement for locking the cover assembly in an expanded configuration;
   a cover member hinged to said outer frame member; and
   said locking arrangement including an outward extending lip on said front edge of said inner frame member, an inward extending lip on said rear edge of said outer frame member, an inward-extending ramp extending from said inner surface of said peripheral wall of said outer frame member, and an outward-extending ramp extending from said outer surface of said peripheral wall of said inner frame member.

2. The adjustable cover assembly of claim 1 including
   a limiting arrangement for limiting the forward travel of said outer frame member with respect to said inner frame member;
   said limiting arrangement including an outward extending lip on said front edge of said inner frame member; and
   an inward extending lip on said rear edge of said outer frame member.

3. The adjustable cover assembly of claim 1 including
   a rear panel on said inner frame member; and
   an opening centered in said rear panel.

4. The adjustable cover assembly of claim 3 wherein said rear panel includes
   slots; and
   electrical device mounting apertures surrounding said opening.

5. The adjustable cover assembly of claim 1 including
   posts extending from said outer surface of said outer frame member;
   ears extending from said cover member; and
   apertures in said ears of said cover member,
   whereby said posts of said outer frame member extend through said apertures in said ears enabling said cover member to rotate with respect to said outer frame member.

6. The adjustable cover assembly of claim 1 wherein
   said inward-extending ramp on said outer frame member includes an outer edge and an inner edge; and
   said inward-extending ramp slopes inward from said outer edge to said inner edge of said inward-extending ramp.

7. The adjustable cover assembly of claim 1 wherein
   said outward-extending ramp on said inner frame member includes an outer edge and an inner edge; and
   said outward-extending ramp slopes outward from said inner edge to said outer edge of said outward-extending ramp.

8. The adjustable cover assembly of claim 1 including
   U-shaped slots in said cover member;
   U-shaped slots in said outer frame member; and
   circular cord openings formed by said U-shaped slots in said cover member and said U-shaped slots in said outer framer member when said cover member is closed upon said outer frame member.

9. The adjustable cover assembly of claim 1 including
   a latch member on said cover member;
   an opening in said latch member;
   a tab extending from said front edge of said outer frame member; and
   said tab of said outer frame member received in said opening of said latch member when said cover member is closed upon said outer frame member.

10. The adjustable cover assembly of claim 1 wherein said outer frame member, said inner frame member, and said cover member are each molded of plastic in one piece.

11. The adjustable cover assembly of claim 1 wherein
    said inner frame member includes a rear edge and an outward extending projection near said rear edge; and
    said outward extending projection contacts said outer frame member when said adjustable cover assembly is in a compressed configuration, said outward extending projection dampening vibration of said outer frame member with respect to said inner frame member.

12. An adjustable cover assembly for covering an electrical box comprising:

an inner frame member including a peripheral wall having an inner surface, a front edge, and a rear edge;

an outer frame member including a peripheral wall having an outer surface and a rear edge;

said inner frame member nesting within and slideable with respect to said outer frame member;

said adjustable cover assembly including a compressed configuration and an expanded configuration;

a locking arrangement for locking the cover assembly in an expanded configuration;

a cover member hinged to said outer frame member;

an adapter plate; and an attachment arrangement for securing said adapter plate to said rear edge of said inner frame member.

13. The adjustable cover assembly of claim 12 wherein said inner frame member includes a rear panel having slots therein;

said adapter plate includes tabs extending therefrom;

a hook extending laterally from said tab; and said tabs on said adapter plate capable of aligning with said slots in said rear panel of said inner frame member.

14. The adjustable cover assembly of claim 13 including a sloping front surface on said hook; and said sloping front surface biasing said tab inwards when said adapter plate is aligned with said slots in said rear panel of said inner frame member and pushed thereon.

15. An adjustable cover assembly for covering an electrical box comprising:

an inner frame member including a peripheral wall having an inner surface, a front edge, and a rear edge;

an outer frame member including a peripheral wall having an outer surface and a rear edge;

said inner frame member nesting within and slideable with respect to said outer frame member;

said adjustable cover assembly including a compressed configuration and an expanded configuration;

a locking arrangement for locking the cover assembly in an expanded configuration;

a cover member hinged to said outer frame member;

said inner frame member includes an outward extending ledge near said rear edge of said inner frame member; and said ledge of said inner frame member contacts said rear edge of said outer frame member when said adjustable cover assembly is in a compressed configuration, said ledge locking said outer frame member with respect to said inner frame member.

* * * * *